US011485860B2

(12) United States Patent
Sanguineti et al.

(10) Patent No.: US 11,485,860 B2
(45) Date of Patent: Nov. 1, 2022

(54) POLYMER ALLOY COMPRISING A SULPHUR-CONTAINING AROMATIC POLYMER AND A FLUOROELASTOMER

(71) Applicant: SOLVAY SPECIALTY POLYMERS ITALY S.P.A., Bollate (IT)

(72) Inventors: Aldo Sanguineti, Milan (IT); Marco Mirenda, Rho (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 566 days.

(21) Appl. No.: 16/607,098

(22) PCT Filed: Apr. 19, 2018

(86) PCT No.: PCT/EP2018/059997
§ 371 (c)(1),
(2) Date: Oct. 21, 2019

(87) PCT Pub. No.: WO2018/193020
PCT Pub. Date: Oct. 25, 2018

(65) Prior Publication Data
US 2020/0385576 A1   Dec. 10, 2020

(30) Foreign Application Priority Data
Apr. 21, 2017  (EP) .................... 17167523

(51) Int. Cl.
| | | |
|---|---|---|
| C08L 81/04 | (2006.01) | |
| C08K 3/22 | (2006.01) | |
| C08L 27/14 | (2006.01) | |
| C08L 27/16 | (2006.01) | |
| C08L 27/18 | (2006.01) | |
| C08L 27/20 | (2006.01) | |
| C08L 81/06 | (2006.01) | |

(52) U.S. Cl.
CPC ............... *C08L 81/04* (2013.01); *C08K 3/22* (2013.01); *C08L 27/14* (2013.01); *C08L 27/16* (2013.01); *C08L 27/18* (2013.01); *C08L 27/20* (2013.01); *C08L 81/06* (2013.01); *C08K 2003/222* (2013.01); *C08K 2003/2206* (2013.01); *C08K 2003/2224* (2013.01)

(58) Field of Classification Search
CPC ...... C08K 2003/2206; C08K 2003/222; C08K 2003/2224; C08L 27/12; C08L 27/14; C08L 27/16; C08L 27/18; C08L 27/20; C08L 81/00; C08L 81/02; C08L 81/04; C08L 81/06; C08L 81/08; C08L 81/10
See application file for complete search history.

(56) References Cited

U.S. PATENT DOCUMENTS

| | | |
|---|---|---|
| 3,634,355 A | 1/1972 | Barr et al. |
| 4,008,203 A | 2/1977 | Jones |
| 4,108,837 A | 8/1978 | Johnson et al. |
| 4,175,175 A | 11/1979 | Johnson et al. |
| 4,281,092 A | 7/1981 | Breazeale |
| 4,395,512 A | 7/1983 | Kubota et al. |
| 5,447,993 A | 9/1995 | Logothetis |
| 5,470,901 A * | 11/1995 | Ishiwari ............... C08L 81/02 524/451 |
| 5,789,489 A | 8/1998 | Coughlin et al. |
| 2016/0194512 A1 | 7/2016 | Bandi et al. |

FOREIGN PATENT DOCUMENTS

| | | |
|---|---|---|
| EP | 0431470 A2 | 6/1991 |
| EP | 661304 A1 | 7/1995 |
| EP | 2949705 A1 | 12/2015 |

OTHER PUBLICATIONS

Standard ASTM D3418-08, "Standard Test Method for Transition Temperatures and Enthalpies of Fusion and Crystallization of Polymers by Differential Scanning Calorimetry", 2008, p. 1-7.

* cited by examiner

*Primary Examiner* — Christopher M Rodd
(74) *Attorney, Agent, or Firm* — Osha Bergman Watanabe & Burton LLP

(57) ABSTRACT

The present invention relates to a polymer alloy comprising a sulphur-containing aromatic polymer and at least one fluoroelastomer, which has improved dispersibility and improved mechanical properties. The invention also relates to a process for the preparation of said polymer alloy and to an article comprising the same.

20 Claims, 4 Drawing Sheets

POLYMER ALLOY COMPRISING A SULPHUR-CONTAINING AROMATIC POLYMER AND A FLUOROELASTOMER

CROSS-REFERENCE TO RELATED APPLICATIONS

This application is a U.S. national stage entry under 35 U.S.C. § 371 of International Application No. PCT/EP2018/059997 filed Apr. 19, 2018, which claims priority to European application No. 17167523.4, filed on Apr. 21, 2017. The entire contents of these applications are explicitly incorporated herein by this reference.

TECHNICAL FIELD

The present invention relates to a polymer alloy comprising a sulphur-containing aromatic polymer and at least one uncrosslinked fluoropolymer, which has improved dispersibility and improved mechanical properties.

The invention also relates to a process for the preparation of said polymer alloy and to an article comprising the same.

BACKGROUND ART

Sulphur-containing aromatic polymer such as polyarylene sulfides and polyarylsulfones are thermally stable engineering plastics consisting mainly of phenyl or biphenyl groups linked by sulfide, ether and/or sulfone groups. Those materials have excellent heat resistance and chemical resistance. However, they have poor mechanical properties, in particular impact resistance.

There has long been interest in improving the mechanical properties of sulphur-containing aromatic polymers.

Blending sulphur-containing aromatic polymers with fluorine-containing polymers can produce novel materials combining the performances and properties of both classes. However, they are highly incompatible and difficult to compound.

It has been already proposed to mix certain polyphenylene sulfide with an inorganic filler and a fluorine containing rubber such as a copolymer of vinylidene fluoride and hexafluoropropylene or the terpolimer vinylidene fluoride-hexafluoropropylene-tetrafluoroethylene. Such blends are disclosed, for instance, in U.S. Pat. No. 4,395,512 (SHIN-ETSU CHEMICAL CO., LTD.). In this document it is stated that said blends show improved impact resistance in comparison with polyphenylene sulfide.

Blends of sulphur-containing aromatic polymers with fluorine-containing polymers tend however to have morphology with large regions or domains of the individual polymers rather than fine, well-dispersed domains. The large domains tend to produce a material with poor mechanical properties, e.g. injection molded parts having poor tensile properties.

The interfaces between these domains also have a poor strength, which in turn generate overall low mechanical properties of the blend.

To improve the dispersibility of the blend, a compatibilizer can be added.

However, U.S. Pat. No. 5,470,901 (DAIKIN INDUSTRIES LTD.) discloses that no suitable compatibilizer having the required chemical and heat resistance properties exists for improving the dispersibility of a fluorine-containing elastomer in polyphenylene sulfide.

U.S. Pat. No. 5,470,901 further discloses that mechanical properties, impact resistance in particular, of compositions comprising polyphenylene sulfide and a fluoroelastomer may be improved if said fluoroelastomer is submitted to crosslinking.

There is still hence a shortfall in the art for blends comprising fluorine-containing polymers finely dispersed into sulphur-containing aromatic polymers which combine the advantageous performances of both ingredients, notably the chemical and heat resistance of sulphur-containing aromatic polymers and the mechanical properties of fluorine-containing polymers.

SUMMARY OF INVENTION

The Applicant has surprisingly found that the compatibilization of sulphur-containing aromatic polymers with uncrosslinked fluoroelastomers is improved if said fluoroelastomer is mixed with certain amounts of at least one divalent metal oxide.

It is thus a first object of the present invention to provide a polymer alloy (PA) comprising:
(a) a sulphur-containing aromatic polymer [aromatic polymer (A)]; and
(b) a mixture (M) of at least one uncrosslinked fluoroelastomer (E) with at least one divalent metal oxide (MO).

Another object of the present invention is to provide a process for preparing said polymer alloy.

In a further object, the present invention is directed to articles made of said polymer alloy.

The Applicant has also surprisingly found that the mixture (M) comprising at least one uncrosslinked fluoroelastomer (E) and at least one divalent metal oxide (MO) is effective, when added in certain amounts, to improve the compatibilization of other fluoropolymers, thermoplastic fluoropolymers in particular, with the sulphur-containing aromatic polymers.

A still further object of the present invention is thus to provide a polymer alloy (PA) comprising:
(a) a sulphur-containing aromatic polymer [aromatic polymer (A)];
(b) a mixture (M) comprising at least one uncrosslinked fluoroelastomer (E) and at least one divalent metal oxide (MO); and
(c) at least one thermoplastic fluoropolymer [fluoropolymer (F)].

DESCRIPTION OF EMBODIMENTS

Aromatic Polymer (A)

Figure 1:
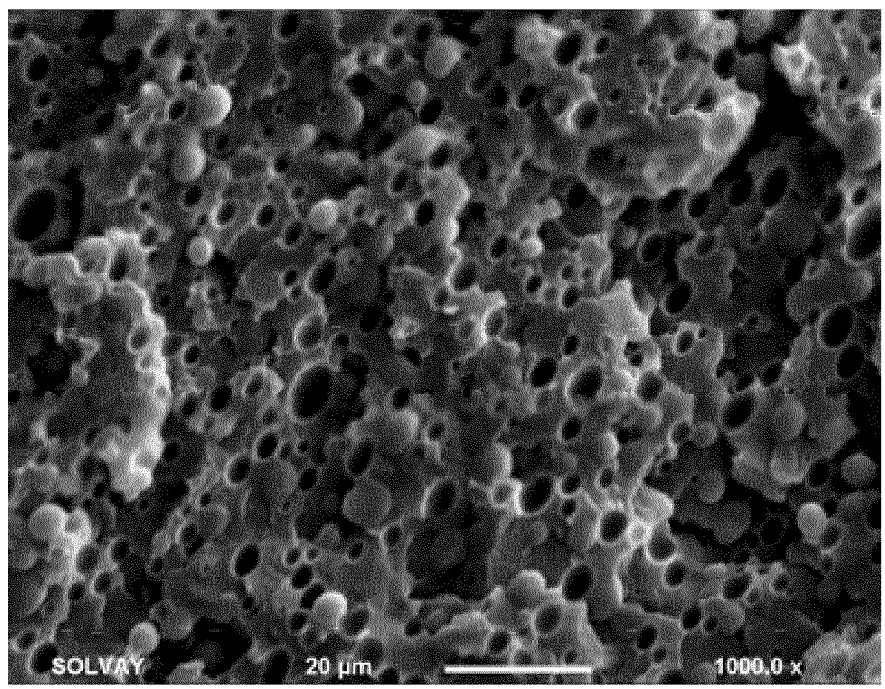
FIG. 1 shows the SEM image of the blend of Comparative Example 1 at a magnification of 1000.0×.

Aromatic polymer (A) to be used in the present invention may be a poly(arylene sulfide) (PAS) or an aromatic sulfone polymer (SP).

PASs are polymers comprising the repeating unit of the formula —(Ar—S)— as the main structural unit, preferably containing the repeating unit in an amount of 80 mol % or more. Ar represents an aromatic group, and examples include units (RU1) represented by the formulas (I) to (XI) given below, among which the formula (I) is particularly preferred:

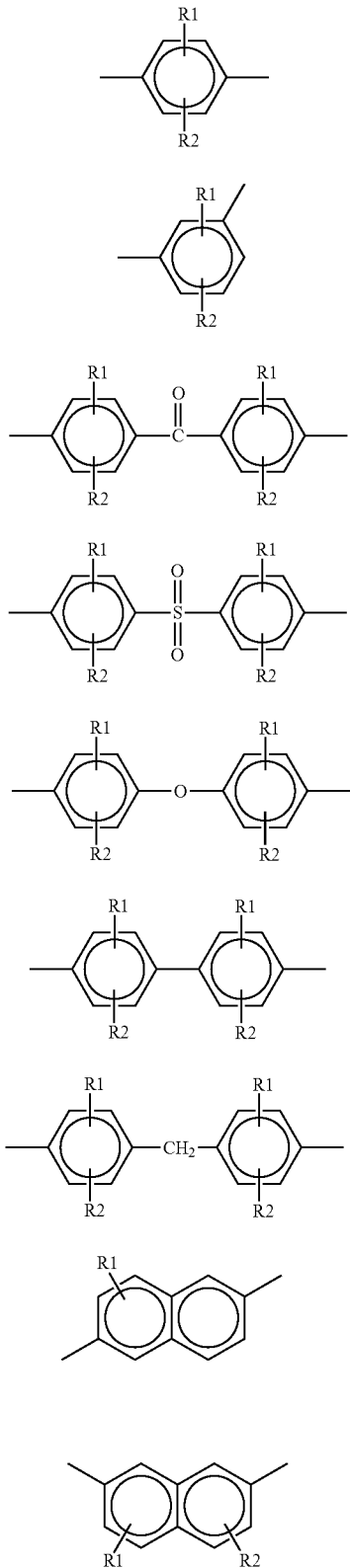

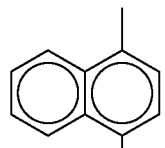

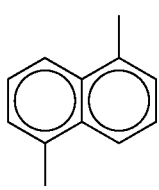

wherein R1 and R2 each represent a substituent selected from hydrogen, alkyl of 1 to 12 carbon atoms, alkoxy of 1 to 12 carbon atoms, arylene of 6 to 24 carbon atoms, and halogen, and R1 and R2 may be the same or different.

Accordingly, poly(arylene sulfide) (PAS) is preferably polyphenylene sulfide (PPS).

For the purposes of the present invention, the definition "aromatic sulfone polymer (SP)" is intended to denote any polymer of which more than 50 wt %, preferably more than 70 wt %, more preferably more than 90 wt %, of recurring units (RU2) comprise at least one group of formula (XII):

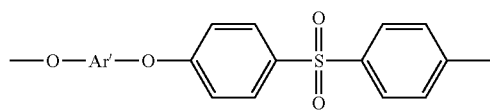

Ar' being a group chosen among the following structures:

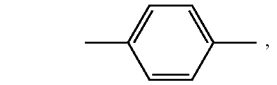

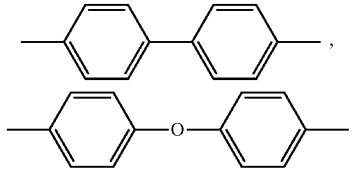

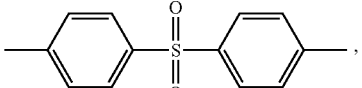

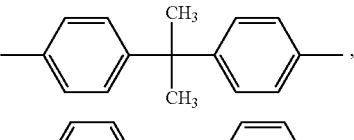

with RD being:

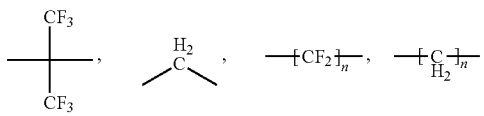

with n=integer from 1 to 6.

The recurring units (RU2) are preferably chosen from:

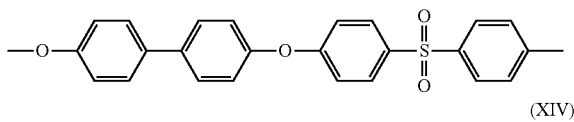  (XIII)

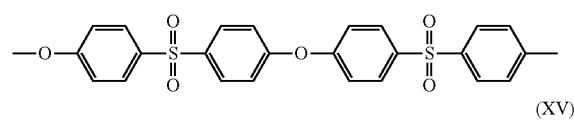  (XIV)

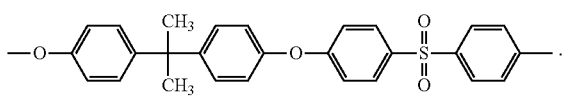  (XV)

Accordingly, aromatic sulfone polymer (SP) is preferably chosen among the group consisting of polysulfone (PSU), polyphenylsulfone (PPSU), polyethersulfone (PESU), copolymers and mixtures thereof and is most preferably a polysulfone (PSU) or polyphenylsulfone (PPSU).

Polysulfone is notably available as UDEL® PSU from Solvay Specialty Polymers USA, L.L.C.

Polysulfone is made by condensing bisphenol A and 4,4'-dichlorodiphenyl sulfone.

Polyphenylsulfone is notably available as RADEL® R from Solvay Specialty Polymers USA, L.L.C and is made by reacting units of 4,4'-dichlorodiphenyl sulfone and 4,4'-biphenol.

Methods well known in the art for the preparation of polyphenylsulfone are for instance those described in documents U.S. Pat. Nos. 3,634,355; 4,008,203; 4,108,837 and 4,175,175, the whole content of which is incorporated herein by reference.

Mixture (M)

Mixture (M) to be used in the present invention is preferably a physical mixture which comprises at least one uncrosslinked fluoroelastomer (E) and at least one divalent metal oxide (MO).

As used herein, the term "physical mixture" refers to a composition in which the constituent components are combined or mixed with no chemical bonding, in particular with substantially no covalent chemical bonding between the constituents.

The divalent metal oxides that can be used in the mixture (M) of this invention are selected from oxides and hydroxides of divalent metal such as Mg, Ca, Pb and Zn. Particularly preferred are oxides and hydroxides of calcium and magnesium.

The mixtures of uncrosslinked fluoroelastomer (E) and at least one divalent metal oxide (MO) in accordance with the present invention preferably comprise the at least one divalent metal oxide (MO) in an amount comprised in the range from 0.1 to 10 parts per 100 parts of the uncrosslinked fluoroelastomer (E).

In a preferred embodiment, mixture (M) comprises at least one uncrosslinked fluoroelastomer (E) and a divalent metal oxide (MO) selected from the group consisting of CaO, Ca(OH)$_2$, MgO, Mg(OH)$_2$ and mixtures thereof.

In a further preferred embodiment, mixture (M) comprises 100 parts of at least one uncrosslinked fluoroelastomer (E), from 0.5 to 5 parts of Ca(OH)$_2$, and from 0.5 to 5 parts of MgO.

Uncrosslinked Fluoroelastomer (E)

The expression "uncrosslinked fluoroelastomer (E)" is used, within the frame of the present invention for designating uncrosslinked polymers comprising recurring units derived from fluorinated monomer(s).

In a first variant, uncrosslinked fluoroelastomer (E) is intended to designate a fluoropolymer resin (R) comprising more than 40% by weight, preferably more than 50% by weight, of recurring units derived from at least one ethylenically unsaturated monomer comprising at least one fluorine atom [fluorinated monomer] and, optionally, recurring units derived from at least one ethylenically unsaturated monomer free from fluorine atom [hydrogenated monomer].

Fluoropolymer resins (R) according to the present invention are substantially amorphous products having a glass transition temperature (Tg) below 25° C.

With the term "substantially amorphous" it is hereby intended to denote a fluoropolymer resin having a degree of crystallinity of less than 30%.

Fluoropolymer resins (R) has advantageously a Tg below 10° C., preferably below 5° C., more preferably 0° C.

Non limitative examples of suitable fluorinated monomers are notably:

$C_2$-$C_8$ fluoro- and/or perfluoroolefins, such as tetrafluoroethylene (TFE), hexafluoropropene (HFP), pentafluoropropylene, and hexafluoroisobutylene;

$C_2$-$C_8$ hydrogenated monofluoroolefins, such as vinyl fluoride, 1,2-difluoroethylene, vinylidene fluoride (VDF) and trifluoroethylene (TrFE);

(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2=CFOR_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2=CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2=CFOX0$, in which X0 is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2=CFOY0$, in which Y0 is a $C_1$-$C_{12}$ alkyl or (per)fluoroalkyl, or a $C_1$-$C_{12}$ oxyalkyl or a $C_1$-$C_{12}$ (per)fluorooxyalkyl, said Y0 group comprising a carboxylic or sulfonic acid group, in its acid, acid halide or salt form;

fluorodioxoles, of formula:

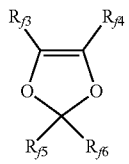

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

In preferred embodiments, fluoropolymer resin (R) comprises, preferably consists of:
(1) VDF-based copolymers, in which VDF is copolymerized with at least one comonomer selected from the group consisting of the followings classes, with the provision that such comonomer is different from VDF:
(a1) $C_2$-$C_8$ perfluoroolefins, such as tetrafluoroethylene (TFE), hexafluoropropylene (HFP), hexafluoroisobutylene;
(b1) hydrogen-containing $C_2$-$C_8$ olefins, such as $C_2$-$C_8$ non-fluorinated olefins (Ol); $C_2$-$C_8$ partially fluorinated olefins, vinyl fluoride (VF), trifluoroethylene (TrFE), perfluoroalkyl ethylenes of formula $CH_2$=CH—Rf, wherein Rf is a $C_1$-$C_6$ perfluoroalkyl group;
(c1) $C_2$-$C_8$ chloro and/or bromo and/or iodo-fluoroolefins such as chlorotrifluoroethylene (CTFE);
(d1) (per)fluoroalkylvinylethers of formula $CF_2$=CFORf, wherein Rf is a $C_1$-$C_6$ (per)fluoroalkyl group; preferably perfluoroalkylvinylethers (PAVE) of above formula wherein Rf is $C_1$-$C_6$ perfluoroalkyl group, e.g. $CF_3$, $C_2F_5$, $C_3F_7$;
(e1) (per)fluoro-oxy-alkylvinylethers of formula $CF_2$=CFOX, wherein X is a $C_1$-$C_{12}$ ((per)fluoro)-oxyalkyl comprising catenary oxygen atoms, e.g. the perfluoro-2-propoxypropyl group;
(f1) (per)fluorodioxoles having formula:

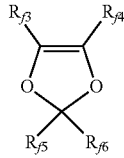

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;
(g1) (per)fluoro-methoxy-vinylethers (MOVE, hereinafter) having formula:

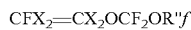

CFX$_2$=CX$_2$OCF$_2$OR"f wherein R"f is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$=F, H; preferably $X_2$ is F and R"f is —$CF_2CF_3$ (MOVE1); —$CF_2CF_2OCF_3$ (MOVE2); or —$CF_3$ (MOVE3);
(h1) $C_2$-$C_8$ non-fluorinated olefins (Ol), for example ethylene and propylene; and
(2) TFE-based copolymers, in which TFE is copolymerized with at least one comonomer selected from the group consisting of the classes (a1), (c1), (d1), (e1), (g1), (h1), and of class
(i2) perfluorovinyl ethers containing cyanide groups, such as notably those described in U.S. Pat. Nos. 4,281,092, 5,447,993 and 5,789,489.

Most preferred fluoropolymer resins (R) are those having following compositions (in mol %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%;
(ii) vinylidene fluoride (VDF) 50-80%, perfluoroalkyl vinyl ethers (PAVE) 5-50%, tetrafluoroethylene (TFE) 0-20%;
(iii) vinylidene fluoride (VDF) 20-30%, C2-C8 non-fluorinated olefins (Ol) 10-30%, hexafluoropropene (HFP) and/or perfluoroalkyl vinyl ethers (PAVE) 18-27%, tetrafluoroethylene (TFE) 10-30%;
(iv) tetrafluoroethylene (TFE) 50-80%, perfluoroalkyl vinyl ethers (PAVE) 20-50%;
(v) tetrafluoroethylene (TFE) 45-65%, C2-C8 non-fluorinated olefins (Ol) 20-55%, vinylidene fluoride 0-30%;
(vi) tetrafluoroethylene (TFE) 32-60% mol %, C2-C8 non-fluorinated olefins (Ol) 10-40%, perfluoroalkyl vinyl ethers (PAVE) 20-40%, fluorovinyl ethers (MOVE) 0-30%;
(vii) tetrafluoroethylene (TFE) 33-75%, perfluoroalkyl vinyl ethers (PAVE) 15-45%, vinylidene fluoride (VDF) 5-30%, hexafluoropropene HFP 0-30%;
(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%;
(ix) tetrafluoroethylene (TFE) 20-70%, fluorovinyl ethers (MOVE) 30-80%, perfluoroalkyl vinyl ethers (PAVE) 0-50%.

Optionally, fluoropolymer resin (R) also comprises recurring units derived from a bis-olefin [bis-olefin (OF)] having general formula:

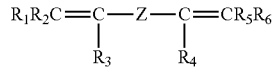

wherein $R_1$, $R_2$, $R_3$, $R_4$, $R_5$ and $R_6$, equal to or different from each other, are H, halogen, a group RAlk or ORAlk, wherein RAlk is a branched or straight chain alkyl radical which can be partially, substantially or completely fluorinated or chlorinated; Z is a linear or branched C1-C18 alkylene or cycloalkylene radical, optionally containing oxygen atoms, preferably at least partially fluorinated, or a (per)fluoropolyoxyalkylene radical, e.g. as described in EP 661304 A (AUSIMONT SPA) Jul. 5, 1995.

The bis-olefin (OF) is preferably selected from the group consisting of those complying with formulae (OF-1), (OF-2) and (OF-3):
(OF-1)

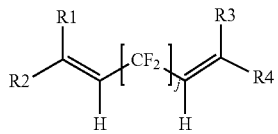

wherein j is an integer between 2 and 10, preferably between 4 and 8, and R1, R2, R3, R4, equal or different from each other, are H, F or C1-5 alkyl or (per)fluoroalkyl group;
(OF-2)

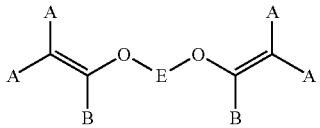

wherein each of A, equal or different from each other and at each occurrence, is independently selected from F, Cl, and H; each of B, equal or different from each other and at each occurrence, is independently selected from F, Cl, H and ORB, wherein RB is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$- group, with m being an integer from 3 to 5; a preferred bis-olefin of (OF-2) type is $F_2C=CF-O-(CF_2)_5-O-CF=CF_2$.
(OF-3)

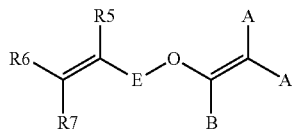

wherein E, A and B have the same meaning as above defined; R5, R6, R7, equal or different from each other, are H, F or $C_{1-5}$ alkyl or (per)fluoroalkyl group.

Preferred uncrosslinked fluoroelastomers (E) according to this first variant are fluoropolymer resin (R) selected from the group consisting of VDF/TFE copolymers, VDF/TFE/HFP terpolymers, VDF/TFE/CTFE terpolymers, VDF/TFE/TrFE terpolymers, VDF/HFP copolymers, VDF/TFE/HFP/CTFE polymers and the like.

In a second variant, uncrosslinked fluoroelastomer (E) may be selected among fluorinated thermoplastic elastomers [polymer (F-TPE)] comprising: (i) at least one elastomeric block (A) consisting of a sequence of recurring units, said sequence comprising recurring units derived from at least one fluorinated monomer, said block (A) possessing a glass transition temperature of less than 25° C., as determined according to ASTM D3418, (ii) at least one thermoplastic block (B) consisting of a sequence of recurring units, said sequence comprising recurring units derived from at least one fluorinated monomer.

Fluorinated Thermoplastic Elastomer [Polymer (F-TPE)]

For the purpose of the present invention, the term "elastomeric", when used in connection with the "block (A)" is hereby intended to denote a polymer chain segment which, when taken alone, has a heat of fusion of less than 2.0 J/g, preferably of less than 1.5 J/g, more preferably of less than 1.0 J/g, as measured according to ASTM D3418.

For the purpose of the present invention, the term "thermoplastic", when used in connection with the "block (B)", is hereby intended to denote a polymer chain segment which, when taken alone, is semi-crystalline, and possesses a detectable melting point, with an associated heat of fusion of exceeding 10.0 J/g, as measured according to ASTM D3418.

The fluorinated thermoplastic elastomer according to this second variant is advantageously a block copolymer, said block copolymer typically having a structure comprising at least one block (A) alternated to at least one block (B), that is to say that said fluorinated thermoplastic elastomer typically comprises, preferably consists of, one or more repeating structures of type (B)-(A)-(B). Generally, the polymer (F-TPE) has a structure of type (B)-(A)-(B), i.e. comprising a central block (A) having two ends, connected at both ends to a side block (B).

The block (A) is often alternatively referred to as soft block (A); the block (B) is often alternatively referred to as hard block (B).

Any of block(s) (A) and (B) is fluorinated, that is to say it comprises recurring units derived from at least one fluorinated monomer, wherein the term "fluorinated monomer" is as above defined.

Any of block(s) (A) and (B) may further comprise recurring units derived from at least one hydrogenated monomer, wherein the term "hydrogenated monomer" is as above defined.

The elastomeric block (A) may further comprise recurring units derived from at least one bis-olefin [bis-olefin (OF)] as above defined.

Should the block (A) consist of a recurring units sequence further comprising recurring units derived from at least one bis-olefin (OF), said sequence typically comprises recurring units derived from the said at least one bis-olefin (OF) in an amount comprised between 0.01% and 1.0% by moles, preferably between 0.03% and 0.5% by moles, more preferably between 0.05% and 0.2% by moles, based on the total moles of recurring units of block (A).

The polymer (F-TPE) preferably consists of:
at least one elastomeric block (A) selected from the group consisting of:
(1) vinylidene fluoride (VDF)-based elastomeric blocks ($A_{VDF}$) consisting of a sequence of recurring units, said sequence comprising recurring units derived from VDF and recurring units derived from at least one fluorinated monomer different from VDF, said fluorinated monomer different from VDF being typically selected from the group consisting of:
(a) $C_2$-$C_8$ perfluoroolefins such as tetrafluoroethylene (TFE), hexafluoropropylene (HFP);
(b) hydrogen-containing $C_2$-$C_8$ fluoroolefins different from VDF, such as vinyl fluoride, trifluoroethylene (VF3), hexafluoroisobutylene (HFIB), perfluoroalkyl ethylenes of formula $CH_2=CH-R_{f1}$, wherein $R_{f1}$ is a $C_1$-$C_6$ perfluoroalkyl group;
(c) $C_2$-$C_8$ chloro- and/or bromo-containing fluoroolefins such as chlorotrifluoroethylene (CTFE);
(d) perfluoroalkylvinylethers (PAVE) of formula $CF_2=CFOR_{f1}$, wherein $R_{f1}$ is a $C_1$-$C_6$ perfluoroalkyl group, such as $CF_3$ (PMVE), $C_2F_5$ or $C_3F_7$;
(e) perfluorooxyalkylvinylethers of formula $CF_2=CFOX0$, wherein X0 is a $C_1$-$C_{12}$ perfluorooxyalkyl group comprising one or more than one ethereal oxygen atom, including notably perfluoromethoxyalkylvinylethers of formula $CF_2=CFOCF_2OR_{f2}$, with $R_{f2}$ being a $C_1$-$C_3$ perfluoro(oxy)alkyl group, such as —$CF_2CF_3$, —$CF_2CF_2$—O—$CF_3$ and —$CF_3$; and (f) (per)fluorodioxoles of formula:

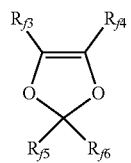

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as —$CF_3$, —$C_2F_5$, —$C_3F_7$, —$OCF_3$ or —$OCF_2CF_2OCF_3$; and (2) tetrafluoroethylene (TFE)-based elastomeric blocks ($A_{TFE}$) consisting of a sequence of recurring units, said sequence comprising recurring units derived from TFE and recurring units derived from at least one fluorinated monomer different from TFE, said fluorinated monomer being typically selected from the group consisting of those of classes (b), (c), (d), (e) as defined above;

at least one thermoplastic block (B) consisting of a sequence of recurring, said sequence comprising recurring units derived from at least one fluorinated monomer.

Any of block(s) ($A_{VDF}$) and ($A_{TFE}$) may further comprise recurring units derived from at least one hydrogenated monomer, which may be selected from the group consisting of hydrogenated alpha-olefins such as ethylene or propylene, and may further comprise recurring units derived from at least one bis-olefin (OF), as above detailed.

The elastomeric block (A) is preferably a block ($A_{VDF}$), as above detailed, said block ($A_{VDF}$) typically consisting of a sequence of recurring units comprising, preferably consisting of:

from 45% to 80% by moles of recurring units derived from vinylidene fluoride (VDF),
from 5% to 50% by moles of recurring units derived from at least one fluorinated monomer different from VDF,
optionally, up to 1.0% by moles of recurring units derived from at least one bis-olefin (OF), as above detailed; and
optionally, up to 30% by moles of recurring units derived from at least one hydrogenated monomer, with respect to the total moles of recurring units of the sequence of block ($A_{VDF}$).

Block (B) may consist of a sequence of recurring units, said sequence comprising:

recurring units derived from one or more than one fluoromonomer, preferably selected from the group consisting of:
(a) $C_2$-$C_8$ perfluoroolefins such as tetrafluoroethylene (TFE), hexafluoropropylene (HFP);
(b) hydrogen-containing $C_2$-$C_8$ fluoroolefins, such as vinylidene fluoride (VDF), vinyl fluoride, trifluoroethylene (VF3), hexafluoroisobutylene (HFIB), perfluoroalkyl ethylenes of formula $CH_2$=$CH$—$R_{f1}$, wherein $R_{f1}$ is a $C_1$-$C_6$ perfluoroalkyl group;
(c) $C_2$-$C_8$ chloro- and/or bromo-containing fluoroolefins such as chlorotrifluoroethylene (CTFE);
(d) perfluoroalkylvinylethers (PAVE) of formula $CF_2$=$CFOR_{f1}$, wherein $R_{f1}$ is a $C_1$-$C_6$ perfluoroalkyl group, such as $CF_3$ (PMVE), $C_2F_5$ or $C_3F_7$;
(e) perfluorooxyalkylvinylethers of formula $CF_2$=$CFOX0$, wherein $X0$ is a $C_1$-$C_{12}$ perfluorooxyalkyl group comprising one or more than one ethereal oxygen atom, including notably perfluoromethoxyalkylvinylethers of formula $CF_2$=$CFOCF_2OR_{f2}$, with $R_{f2}$ being a $C_1$-$C_3$ perfluoro(oxy)alkyl group, such as —$CF_2CF_3$, —$CF_2CF_2$—O—$CF_3$ and —$CF_3$; and
(f) (per)fluorodioxoles of formula:

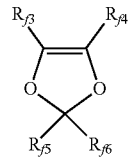

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as —$CF_3$, —$C_2F_5$, —$C_3F_7$, —$OCF_3$ or —$OCF_2CF_2OCF_3$; and
optionally, recurring units derived from one or more than one hydrogenated monomer, as above detailed, including notably ethylene, propylene, (meth)acrylic monomers, styrenic monomers.

More specifically, block (B) may be selected from the group consisting of:

blocks ($B_{VDF}$) consisting of a sequence of recurring units derived from vinylidene fluoride and optionally from one or more than one additional fluorinated monomer different from VDF, e.g. HFP, TFE or CTFE, and optionally from a hydrogenated monomer, as above detailed, e.g. a (meth)acrylic monomer, whereas the amount of recurring units derived from VDF is of 85 to 100% moles, based on the total moles of recurring units of block ($B_{VDF}$);

blocks ($B_{TFE}$) consisting of a sequence of recurring units derived from tetrafluoroethylene, and optionally from an additional perfluorinated monomer different from TFE, whereas the amount of recurring units derived from TFE is of 75 to 100% moles, based on the total moles of recurring units of block (B);

blocks ($B_{E/(C)TFE}$) consisting of a sequence of recurring units derived from ethylene and recurring units derived from CTFE and/or TFE, possibly in combination with an additional monomer.

The weight ratio between blocks (A) and blocks (B) in the fluorinated thermoplastic elastomer is typically comprised between 95:5 and 10:90.

According to certain preferred embodiments, the polymers (F-TPE) comprise a major amount of blocks (A); according to these embodiment's, the polymer (F-TPE) used in the method of the present invention is characterized by a weight ratio between blocks (A) and blocks (B) of 95:5 to 65:35, preferably 90:10 to 70:30.

The Applicant has surprisingly found that the addition of a divalent metal oxide (MO) to an uncrosslinked fluoroelastomer (E) allows the preparation of polymer alloys comprising sulphur-containing aromatic polymers and uncrosslinked fluoropolymers in all proportions by weight, wherein the components of the alloys are uniformly dispersed.

It has in fact been observed that after melt mixing a blend of a sulphur-containing aromatic polymer with a mixture of an uncrosslinked fluoroelastomer with at least one divalent metal oxide at a temperature which is above the temperature where all the components are in the molten form, a plurality of discrete domains dispersed within a continuous phase is formed, wherein the dimension of the particle size of said discrete domains is markedly decreased in comparison with the blend not submitted to melt mixing.

The polymer alloy (PA) according to the first object of the present invention may comprise:
(a) from 1 to 99% by weight of aromatic polymer (A); and
(b) from 1 to 99% by weight of mixture (M), comprising at least one uncrosslinked fluoroelastomer (E) and at least one divalent metal oxide (MO), all the aforementioned percentages by weight being referred to the total weight of polymer alloy (PA).

In one aspect, the present invention provides a polymer alloy comprising a continuous phase of a sulphur-containing aromatic polymer [aromatic polymer (A)] and discrete domains of at least one uncrosslinked fluoroelastomer (E).

In a preferred embodiment according to this first aspect, the present invention provides a polymer alloy (PA) which comprises:
(a) from 60 to 90%, preferably from 70 to 85% by weight of aromatic polymer (A);
(b) from 10 to 40%, preferably from 20 to 30%, more preferably from 15 to 25% by weight of mixture (M), comprising at least one uncrosslinked fluoroelastomer (E) and at least one divalent metal oxide (MO), all the aforementioned percentages by weight being referred to the total weight of polymer alloy (PA).

In a second aspect, the present invention provides a polymer alloy comprising a continuous phase of at least one uncrosslinked fluoroelastomer (E) and discrete domains of a sulphur-containing aromatic polymer [aromatic polymer (A)].

In a preferred embodiment according to this second aspect, the present invention provides a polymer alloy (PA) which comprises:
(a) from 10 to 40%, preferably from 20 to 30% by weight of aromatic polymer (A);
(b) from 60 to 90%, preferably from 70 to 85% by weight of mixture (M), comprising at least one uncrosslinked fluoroelastomer (E) and at least one divalent metal oxide (MO), all the aforementioned percentages by weight being referred to the total weight of polymer alloy (PA).

The Applicant has also surprisingly found that the use of a mixture (M) comprising at least one uncrosslinked fluoroelastomer (E) and at least one divalent metal oxide (MO) can be used to improve the dispersibility of thermoplastic fluoropolymers in sulphur-containing aromatic polymers, thus allowing the preparation of polymer alloys comprising a sulphur-containing aromatic polymers and thermoplastic fluoropolymers in all proportion by weight, wherein all the components in the polymer alloy are uniformly dispersed.

A second object of the present invention is thus to provide a polymer alloy (PA) comprising:
(a) a sulphur-containing aromatic polymer [aromatic polymer (A)];
(b) a mixture (M) comprising at least one uncrosslinked fluoroelastomer (E) and at least one divalent metal oxide (MO); and
(c) at least one thermoplastic fluoropolymer [fluoropolymer (F)].

Mixing a blend of a thermoplastic fluoropolymer and a sulphur-containing aromatic polymer in the presence of certain amounts of a mixture of at least one uncrosslinked fluoroelastomer (E) with at least one divalent metal oxide (MO) at a temperature which is above the temperature where all the components are in the molten form results in fact in a uniformly dispersed alloy wherein dispersed domains of reduced average particle size are dispersed within a continuous phase.

Without wishing to be bound to any theory, it is believed that melt blending a sulphur-containing aromatic polymer with a mixture of at least one uncrosslinked fluoroelastomer (E) with at least one divalent metal oxide (MO) gives a chemically linked fluorinated-aromatic moiety which acts as an in-situ-generated compatibilizer.

Thus, according to this second object it is provided a polymer alloy (PA) preferably comprising:
(a) from 1 to 98.9% by weight of aromatic polymer (A);
(b) from 0.1 to 20% by weight, preferably from 1 to 10% by weight, more preferably from 2 to 5% by weight, of a mixture (M) comprising at least one uncrosslinked fluoroelastomer (E) and at least one divalent metal oxide (MO); and
(c) from 1 to 98.9% by weight of at least one fluoropolymer (F), all the aforementioned percentages by weight being referred to the total weight of polymer alloy (PA).

Fluoropolymer (F)

The expression "fluoropolymer (F)" is used, within the frame of the present invention for designating a thermoplastic polymer, that is to say a polymer which softens on heating and hardens on cooling at room temperature, which at room temperature exists below its glass transition temperature if fully amorphous or below its melting point if semi-crystalline.

It is nevertheless generally preferred for the fluoropolymer (F) to be semi-crystalline, that is to say to have a definite melting point; preferred fluoropolymers (F) are those possessing a heat of fusion of at least 5 J/g, preferably of at least 10 J/g, more preferably at least 30 J/g. Without upper limit for heat of fusion being critical, it is nevertheless understood that fluoropolymer (F) will generally possess a heat of fusion of at most 55 J/g, preferably of at most 53 J/g, more preferably of at most 50 J/g.

Heat of fusion is generally determined by DSC according to ASTM D3418 standard.

The fluoropolymer (F) according to this second object comprises:
recurring units derived from at least one fluorinated monomer, wherein the term "fluorinated monomer" used in connection with the "fluoropolymer (F)" is as above defined; and
optionally, recurring units derived from one or more than one hydrogenated monomer, as above detailed, including notably ethylene, propylene, (meth)acrylic monomers, styrenic monomers.

In one preferred embodiment according to this second object, fluoropolymer (F) comprises:
recurring units derived from vinylidene fluoride and optionally from one or more than one additional fluorinated monomer different from VDF,
e.g. HFP, TFE or CTFE, and optionally from a hydrogenated monomer, as above detailed, e.g. a (meth)acrylic monomer, whereas the amount of recurring units derived from VDF is of 85 to 100% moles, based on the total moles of recurring units of fluoropolymer (F).

In another preferred embodiment according to this second object, fluoropolymer (F) comprises:
recurring units derived from tetrafluoroethylene, and optionally from an additional perfluorinated monomer different from TFE, such as perfluorooxyalkylvinylethers, whereas the amount of recurring units derived from TFE is of 75 to 100% moles, based on the total moles of recurring units of fluoropolymer (F).

In still another preferred embodiment according to this second object, fluoropolymer (F) comprises:

recurring units derived from ethylene and recurring units derived from CTFE and/or TFE, possibly in combination with an additional monomer.

The mixture (M) in the polymer alloy according to this second object can be present in an amount comprised between 0.1 to 20% by weight, preferably from 1 to 10% by weight, more preferably from 2 to 5% by weight, with respect to the total weight of the polymer alloy (PA).

In one aspect of this second object, the present invention provides a polymer alloy comprising a continuous phase of a sulphur-containing aromatic polymer [aromatic polymer (A)] and discrete domains of a fluoropolymer (F) and of an uncrosslinked fluoroelastomer (E).

In a preferred embodiment according to this aspect, the polymer alloy (PA) comprises:
(a) from 60 to 90%, preferably from 70 to 80%, by weight of aromatic polymer (A);
(b) from 0.1 to 20% by weight, preferably from 1 to 10% by weight, more preferably from 2 to 5% by weight, of a mixture (M) comprising at least one uncrosslinked fluoroelastomer (E) and at least one divalent metal oxide (MO); and
(c) from 9 to 39%, preferably from 15 to 35%, more preferably from 20 to 30% by weight of at least one fluoropolymer (F), all the aforementioned percentages by weight being referred to the total weight of polymer alloy (PA).

In a second aspect of this second object, the present invention provides a polymer alloy comprising a co-continuous phase of a fluoropolymer (F) and of an uncrosslinked fluoroelastomer (E) and discrete domains of a sulphur-containing aromatic polymer [aromatic polymer (A)].

In a preferred embodiment according to this aspect, the polymer alloy (PA) comprises:
(a) from 10 to 40%, preferably from 15 to 25% by weight of aromatic polymer (A);
(b) from 0.1 to 20% by weight, preferably from 1 to 10% by weight, more preferably from 2 to 5% by weight, of a mixture (M) comprising at least one uncrosslinked fluoroelastomer (E) and at least one divalent metal oxide (MO); and
(c) from 59 to 89%, preferably from 75 to 85% by weight of at least one fluoropolymer (F).

The average particle size of the discrete domains in the polymer alloy of the present invention is conveniently less than 2 microns, preferably less than 1 micron, more preferably less than 0.5 microns. The average particle size of the components of the polymer alloy according to the present invention can be measured by Scanning Electron Microscopy on the freeze fractured blend obtained after melt mixing the blend above the temperature where all the components are in the molten form, as the average over 100 particles obtained by analyzing pictures at about 1000× magnification.

To further improve the mechanical properties of the polymer alloy, various additives like fillers and plasticizers, such as organic esters, may be added to the polymer alloy of the present invention. Examples of the fillers are glass fibers, asbestos fibers, silica fibers, silica-alumina fibers, alumina fibers, zirconia fibers, potassium titanate whiskers, polyamide fibers, polyphenol fibers, silica, talc, clay, mica, calcium carbonate, barium sulfate, titanium oxide, silicon nitride and the like.

In a further object, the present invention provides a process for preparing the polymer alloy (PA) as above defined, said process comprising melt mixing the aromatic polymer (A), the mixture (M) and, optionally the at least one fluoropolymer (F).

Melt mixing is carried out at a temperature where all the components are in the molten form, thus at a temperature above the glass transition temperature or above the melting temperature of all the components.

In the melt mixing procedure, the aromatic polymer (A), the mixture (M) and, optionally the at least one fluoropolymer (F) can be melted together, brought separately to their respective melting temperature and then mixed with each other, or subsequently added to a first melted polymer.

In a preferred embodiment according to the first object defined above, the melt mixing procedure is carried out by adding the mixture (M) to the aromatic polymer (A) in the molten form.

In a preferred embodiment according to the second object defined above, the melt mixing procedure is carried out by adding the mixture (M) to the aromatic polymer (A) in the molten form, mixing for few minutes, and then adding of the at least one fluoropolymer (F).

In a further preferred embodiment according to the second object defined above, mixture (M) and at least one fluoropolymer (F) are added to the aromatic polymer (A) in the molten form.

The blend thus formed is allowed to stir for some minutes and allowed to cool to room temperature to provide the polymer alloy of the invention.

The polymer alloy of the present invention is preferably in the form of pellets.

The polymer alloy of the present invention has improved mechanical properties, in particular tensile properties, while maintaining the excellent properties of the parent polymers. Therefore, the polymer alloy of the present invention is suitably used in various fields including Automotive, Oil and Gas and Chemical Process Industry.

In a further object, therefore, the present invention provides an article comprising the polymer alloy as defined above. Preferably, the article according to the present invention can be a pipe or a piece of equipment formed by extrusion or molding technologies. Preferably, injection molding is used to obtain the wanted piece of equipment. Additionally, the articles of the present invention can be adhered to other articles by coextrusion or overmolding technologies.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

Experimental Part

Raw Materials
PPS: Polyphenylene sulfide, commercially available as Ryton® from Solvay.
FKM1=vinylidene fluoride/hexafluoropropylene/tetrafluoroethylene terpolymer having 68.5% fluorine content.
FKM2=vinylidene fluoride/hexafluoropropylene copolymer having 66.0% fluorine content.
Ca(OH)$_2$, commercially available as Rhenofit®-CF from Rhein Chemie.

MgO, commercially available as Maglite-DE® from Hallstar.

As internal mixer in the following examples, a Brabender 50 EHT equipped with roller blades was used.

Measurement of Particle Size

The average particles size of the components of the polymer alloys of the examples was measured by SEM as the average over 100 particles obtained by analyzing pictures at about 1000× magnification.

Tensile Measurement

Tensile measurements were carried out according to ASTM D638 specimen type V.

Comparative Example 1

A blend of PPS and FKM1 was prepared in an internal mixer at 310° C. using roller blades. About 53 grams of PPS were poured into the mixer and melted for 15 minutes at 30 rpm. Then, 18 gram of FKM1 were added and mixed at 70 rpm for 15 min. Finally, the mixture was manually removed from the mixer, grinded in liquid nitrogen and subsequently compression molded in a 1 mm thick film for tensile and SEM analysis.

The SEM image of the blend obtained in Comparative Example 1 is shown in FIG. 1.

Example 1

In a first step, about 100 grams of FKM1 was mixed with 2 grams of Ca(OH)$_2$ and 1 gram of MgO in an internal mixer using elastomer blades at 10 rpm for 30 minutes, cooling the mixer with compressed air. The thus obtained MIXTURE 1 was removed from the mixer and grinded in liquid nitrogen for following use. In a second step, a blend of PPS and MIXTURE 1 was prepared in an internal mixer at 310° C. using roller blades: about 53 grams of PPS were poured into the mixer and melted for 15 minutes at 30 rpm, then, 18 grams of MIXTURE 1 were added and mixed at 70 rpm for 15 min. Finally, the blend was manually removed from the mixer and grinded in liquid nitrogen and subsequently compression molded in a 1 mm thick film for tensile and SEM analysis.

Figure 2:
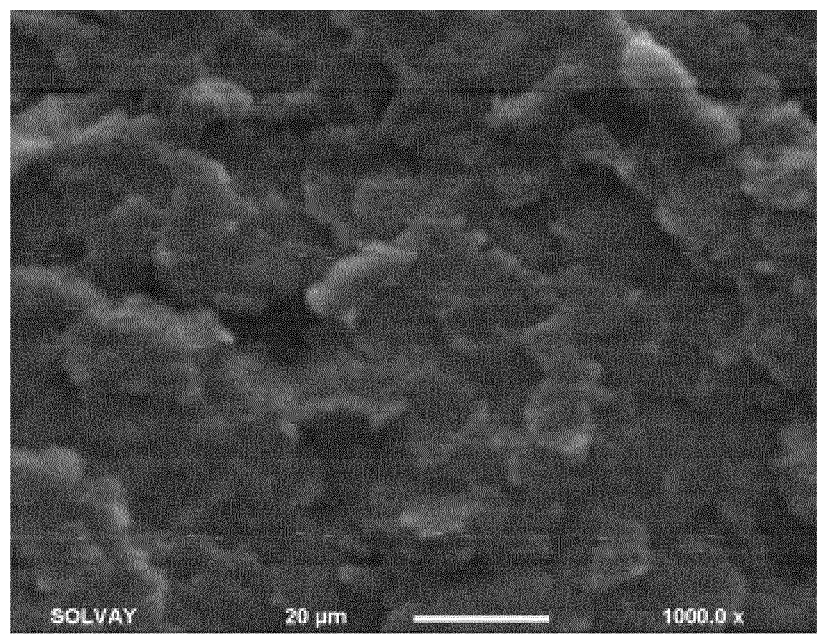
FIG. 2 shows the SEM image of the blend of Example 1 at a magnification of 1000.0×.

The SEM image of the blend obtained in Example 1 is shown in FIG. 2.

Comparative Example 2

A blend of PPS and FKM2 was prepared in an internal mixer at 310° C. using roller blades. About 53 grams of PPS were poured into the mixer and melted for 15 minutes at 30 rpm. Then, 18 gram of FKM2 were added and mixed at 70 rpm for 15 min. Finally, the blend was manually removed from the mixer, grinded in liquid nitrogen and subsequently compression molded in a 1 mm thick film for tensile and SEM analysis.

Figure 3:
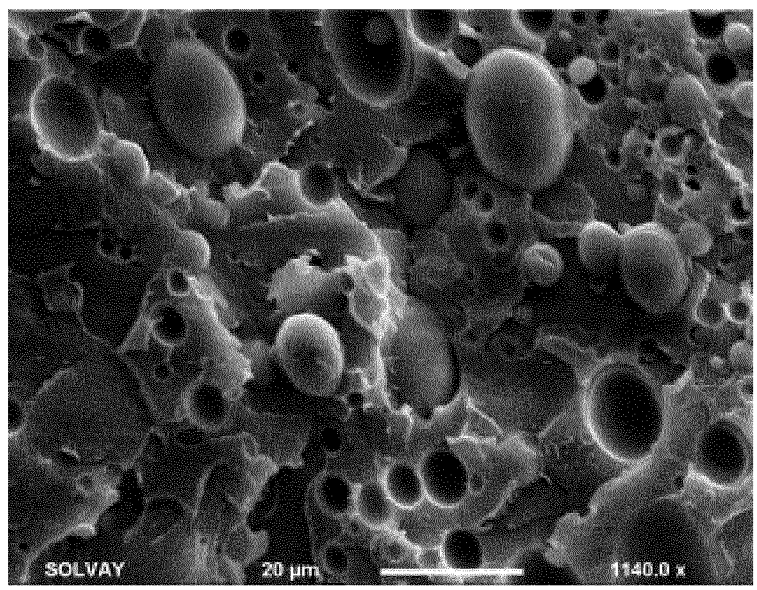
FIG. 3 shows the SEM image of the blend of Comparative Example 2 at a magnification of 1040.0×.

The SEM image of the blend obtained in Comparative Example 2 is shown in FIG. 3.

Example 2

In a first step, about 100 grams of FKM2 were mixed with 2 grams of Ca(OH)$_2$ and 1 gram of MgO in an internal mixer using elastomer blades at 10 rpm for 30 minutes, cooling the mixer with compressed air. The thus obtained MIXTURE 2 was removed from the mixer and grinded in liquid nitrogen for following use. In a second step, a blend of PPS and MIXTURE 2 was prepared in an internal mixer at 310° C. using roller blades. About 53 grams of PPS were poured into the mixer and melted for 15 minutes at 30 rpm. Then, 18 grams of MIXTURE 2 were added and mixed at 70 rpm for 15 min. Finally, the blend was manually removed from the mixer, grinded in liquid nitrogen and subsequently compression molded in a 1 mm thick film for tensile and SEM analysis.

Figure 4:
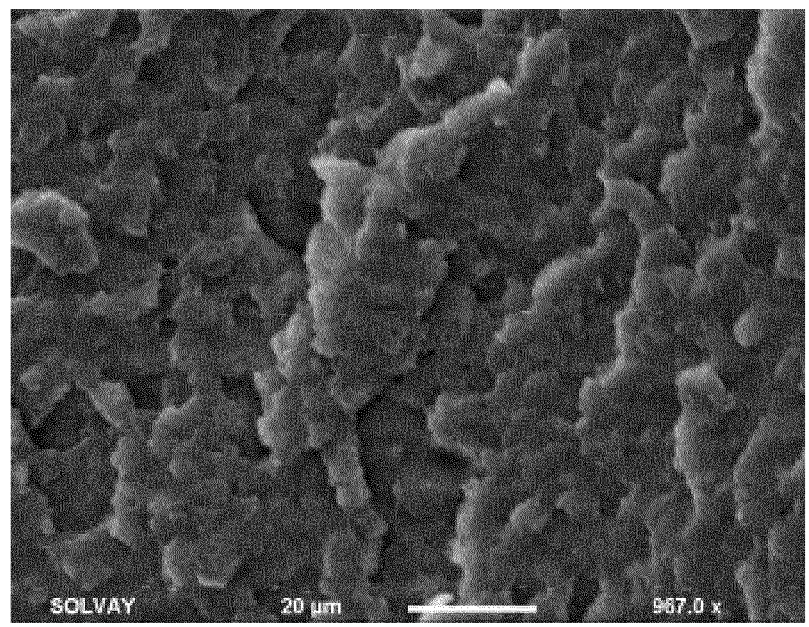
FIG. 4 shows the SEM image of the blend of Example 2 at a magnification of 967.0×.

The SEM image of the blend obtained in Example 2 is shown in FIG. 4.

TABLE 1

| Example | PPS parts | FKM1 parts | FKM2 | MIXTURE 1 parts | MIXTURE 2 parts | Average Particle size (μm) | Elongation at break % |
|---|---|---|---|---|---|---|---|
| Comp. 1 | 75 | 25 | — | — | — | 2.3 | 16 |
| 1 | 75 | — | — | 25 | — | <0.2 | 32 |
| Comp. 2 | 75 | — | 25 | — | — | 8 | 12 |
| 2 | 75 | — | — | — | 25 | <0.2 | 24 |

The polymer alloy according to the present invention show a markedly reduced average particle size of the uncrosslinked fluoroelastomer (E) in comparison with the alloy prepared in the absence of any metal oxide or hydroxide.

This result demonstrates the effect of the presence of at least one metal oxide in improving the compatibilization of fluoroelastomers with sulphur-containing aromatic polymers.

Moreover, the polymer alloys according to the present invention show improved tensile properties, as demonstrated by the improved elongation at break.

The invention claimed is:

1. A polymer alloy (PA) comprising:
    (a) an aromatic polymer (A), which is a sulphur-containing aromatic polymer; and
    (b) a mixture (M) of at least one uncrosslinked fluoroelastomer (E) with at least one oxide or hydroxide of divalent metal (MO).

2. The polymer alloy according to claim 1 wherein the aromatic polymer (A) is a poly(arylene sulfide) (PAS) or an aromatic sulfone polymer (SP).

3. The polymer alloy according to claim 1 wherein the uncrosslinked fluoroelastomer (E) is selected from:
    a fluoropolymer resin (R) comprising more than 40% by weight of recurring units derived from at least one fluorinated monomer, wherein the fluorinated monomer is an ethylenically unsaturated monomer comprising at least one fluorine atom and, optionally, recurring units derived from at least one hydrogenated monomer, wherein the hydrogenated monomer is an ethylenically unsaturated monomer free from fluorine atom, substantially amorphous products having a glass transition temperature (Tg) below 25° C.; and
a polymer (F-TPE), wherein polymer (F-TPE) is a fluorinated thermoplastic elastomer comprising:
(i) at least one elastomeric block (A) consisting of a sequence of recurring units, said sequence comprising recurring units derived from at least one fluorinated monomer, said block (A) possessing a glass transition temperature of less than 25° C., as determined according to ASTM D3418,
(ii) at least one thermoplastic block (B) consisting of a sequence of recurring units, said sequence comprising recurring units derived from at least one fluorinated monomer.

4. The polymer alloy (PA) according to claim 3 wherein the fluoropolymer resin (R) comprises:
(1) VDF-based copolymers, in which VDF is copolymerized with at least one comonomer selected from the group consisting of the followings classes, with the provision that such comonomer is different from VDF:
(a1) $C_2$-$C_8$ perfluoroolefins;
(b1) hydrogen-containing $C_2$-$C_8$ olefins;
(c1) $C_2$-$C_8$ chloro and/or bromo and/or iodo-fluoroolefins;
(d1) (per)fluoroalkylvinylethers of formula $CF_2$=CFORf, wherein Rf is a $C_1$-$C_6$ (per)fluoroalkyl group;
(e1) (per)fluoro-oxy-alkylvinylethers of formula $CF_2$=CFOX, wherein X is a $C_1$-$C_{12}$ ((per)fluoro)-oxyalkyl comprising catenary oxygen atoms;
(f1) (per)fluorodioxoles having formula:

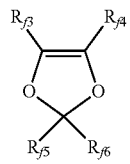

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;
(g1) (per)fluoro-methoxy-vinylethers having formula:

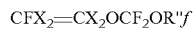
$CFX_2$=$CX_2OCF_2OR''f$ wherein R''f is selected from $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H;
(h1) $C_2$-$C_8$ non-fluorinated olefins (Ol); or
(2) TFE-based copolymers, in which TFE is copolymerized with at least one comonomer selected from the group consisting of the classes (a1), (c1), (d1), (e1), (g1), (h1), and of class (i2):
(i2) perfluorovinyl ethers containing cyanide groups.

5. The polymer alloy (PA) according to according to claim 4 wherein the fluoropolymer resin (R) is selected from the group consisting of VDF/TFE copolymers, VDF/TFE/HFP terpolymers, VDF/TFE/CTFE terpolymers, VDF/TFE/TrFE terpolymers, VDF/HFP copolymers, VDF/TFE/HFP/CTFE polymers.

6. The polymer alloy (PA) according to claim 1 wherein the at least one oxide or hydroxide of divalent metal (MO) is selected from the group consisting of CaO, Ca(OH)$_2$, MgO, Mg(OH)$_2$ and mixtures thereof.

7. The polymer alloy (PA) according to claim 1 wherein the mixture (M) comprises 100 parts of at least one uncrosslinked fluoroelastomer (E), from 0.5 to 5 parts of Ca(OH)$_2$, and from 0.5 to 5 parts of MgO.

8. The polymer alloy (PA) according to claim 1 which comprises:
(a) from 60 to 90% by weight of aromatic polymer (A);
(b) from 10 to 40% by weight of mixture (M),
all the aforementioned percentages by weight being referred to the total weight of polymer alloy (PA).

9. A polymer alloy (PA) comprising:
(a) an aromatic polymer (A), which is a sulphur-containing aromatic polymer;
(b) a mixture (M) of at least one uncrosslinked fluoroelastomer (E) with at least one divalent metal oxide (MO); and
(c) at least one thermoplastic fluoropolymer (F).

10. A polymer alloy (PA) according to claim 9 wherein the at least one fluoropolymer (F) comprises:
recurring units derived from one or more than one monomer (FM) preferably selected from the group consisting of:
(a) $C_2$-$C_8$ perfluoroolefins;
(b) hydrogen-containing $C_2$-$C_8$ fluoroolefins;
(c) $C_2$-$C_8$ chloro- and/or bromo-containing fluoroolefins;
(d) perfluoroalkylvinylethers (PAVE) of formula $CF_2$=$CFOR_{f1}$, wherein $R_{f1}$ is a $C_1$-$C_6$ perfluoroalkyl group;
(e) perfluorooxyalkylvinylethers of formula $CF_2$=$CFOX_0$, wherein $X_0$ is a $C_1$-$C_{12}$ perfluorooxyalkyl group comprising one or more than one ethereal oxygen atom; and
(f) (per)fluorodioxoles of formula:

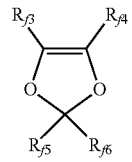

wherein each of $R_{f3}$, $R_{f4}$, $R_{f5}$ and $R_{f6}$, equal to or different from each other, is independently a fluorine atom, or a $C_1$-$C_6$ perfluoro(oxy)alkyl group, optionally comprising one or more oxygen atoms; and
optionally, recurring units derived from one or more than one hydrogenated monomer.

11. A polymer alloy (PA) according to claim 9, wherein the mixture (M) is present in an amount comprised between 0.1 to 20% by weight, with respect to the total weight of the polymer alloy (PA).

12. The polymer alloy (PA) according to claim 9 which comprises:
(a) from 60 to 90% by weight of aromatic polymer (A);
(b) from 0.1 to 20% by weight of a mixture (M); and
(c) from 9 to 39% by weight of at least one fluoropolymer (F),
all the aforementioned percentages by weight being referred to the total weight of polymer alloy (PA).

13. A process for preparing the polymer alloy (PA) according to claim 1, said process comprising melt mixing the aromatic polymer (A), the mixture (M) and, optionally the at least one fluoropolymer (F).

14. An article comprising the polymer alloy according to claim 1.

15. The polymer alloy according to claim 2 wherein the aromatic polymer (A) is a polyphenylene sulfide (PPS), a polysulfone (PSU) or a polyphenylsulfone (PPSU).

16. The polymer alloy (PA) according to claim 4 wherein the fluoropolymer resin (R) comprises:
(1) VDF-based copolymers, in which VDF is copolymerized with at least one comonomer selected from the group consisting of the following:
(a1) tetrafluoroethylene (TFE), hexafluoropropylene (HFP), hexafluoroisobutylene;
(b1) $C_2$-$C_8$ non-fluorinated olefins (Ol), $C_2$-$C_8$ partially fluorinated olefins, vinyl fluoride (VF), trifluoroethylene (TrFE), perfluoroalkyl ethylenes of formula $CH_2=CH-Rf$, wherein Rf is a $C_1$-$C_6$ perfluoroalkyl group;
(c1) chlorotrifluoroethylene (CTFE);
(d1) (per)fluoroalkylvinylethers of formula $CF_2=CFORf$, wherein Rf is a $C_1$-$C_6$ perfluoroalkyl group;
(e1) (per)fluoro-oxy-alkylvinylethers of formula $CF_2=CFOX$, wherein X is a perfluoro-2-propoxypropyl group;
(f1) (per)fluorodioxoles having formula:

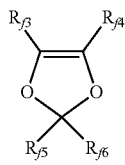

wherein $R_{f3}$, $R_{f4}$, $R_{f5}$, $R_{f6}$, equal or different from each other, are independently selected from $-F$, $-CF_3$, $-C_2F_5$, $-C_3F_7$, $-OCF_3$, or $-OCF_2CF_2OCF_3$;
(g1) (per)fluoro-methoxy-vinylethers having formula:

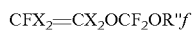

wherein $X_2$ is F and R"f is $-CF_2CF_3$; $-CF_2CF_2OCF_3$; or $-CF_3$;
(h1) ethylene and propylene; or
(2) TFE-based copolymers, in which TFE is copolymerized with at least one comonomer selected from the group consisting of the classes (a1), (c1), (d1), (e1), (g1), (h1), and of class (i2):
(i2) perfluorovinyl ethers containing cyanide groups.

17. The polymer alloy (PA) according to claim 8 which comprises:
(a) from 70 to 80% by weight of aromatic polymer (A);
(b) from 20 to 30% by weight of mixture (M),
all the aforementioned percentages by weight being referred to the total weight of polymer alloy (PA).

18. A polymer alloy (PA) according to claim 10 wherein the one or more than one monomer (FM) is selected from the group consisting of:
(a) tetrafluoroethylene (TFE), hexafluoropropylene (HFP);
(b) vinylidene fluoride (VDF), vinyl fluoride, trifluoroethylene (VF3), hexafluoroisobutylene (HFIB), perfluoroalkyl ethylenes of formula $CH_2=CH-R_{f1}$, wherein $R_{f1}$ is a $C_1$-$C_6$ perfluoroalkyl group;
(c) chlorotrifluoroethylene (CTFE);
(d) perfluoroalkylvinylethers (PAVE) of formula $CF_2=CFOR_{f1}$, wherein $R_{f1}$ is $CF_3$, $C_2F_5$ or $C_3F_7$;
(e) perfluoromethoxyalkylvinylethers of formula $CF_2=CFOCF_2OR_{f2}$, wherein $R_{f2}$ is a $C_1$-$C_3$ perfluoro(oxy)alkyl group; and
(f) (per)fluorodioxoles of formula:

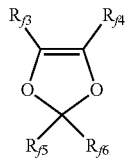

wherein each of $R_{f3}$, $R_{f4}$, $R_{f5}$ and $R_{f6}$, equal to or different from each other, is independently a fluorine atom, $-CF_3$, $-C_2F_5$, $-C_3F_7$, $-OCF_3$ or $-OCF_2CF_2OCF_3$.

19. A polymer alloy (PA) according to claim 11, wherein the mixture (M) is present in an amount comprised between 2 to 5% by weight, with respect to the total weight of the polymer alloy (PA).

20. The polymer alloy (PA) according to claim 12 which comprises:
(a) from 70 to 80%, by weight of aromatic polymer (A);
(b) from 2 to 5% by weight, of a mixture (M); and
(c) from 20 to 30% by weight of at least one fluoropolymer (F),
all the aforementioned percentages by weight being referred to the total weight of polymer alloy (PA).

* * * * *